United States Patent [19]
Byrne

[11] Patent Number: 5,951,172
[45] Date of Patent: Sep. 14, 1999

[54] SLEEVE BEARING LUBRICATION

[75] Inventor: Thomas R. Byrne, Port Washington, Wis.

[73] Assignee: Orion Corporation, Grafton, Wis.

[21] Appl. No.: 09/023,459

[22] Filed: Feb. 13, 1998

Related U.S. Application Data

[63] Continuation-in-part of application No. 08/916,189, Aug. 21, 1997, Pat. No. 5,879,085, which is a continuation-in-part of application No. 08/848,986, Apr. 30, 1997, Pat. No. 5,795,076, which is a continuation of application No. 08/542,521, Oct. 13, 1995, abandoned.

[51] Int. Cl.[6] .................................................. F16C 17/02
[52] U.S. Cl. ................................... 384/313; 384/398
[58] Field of Search .................................. 384/313, 316, 384/398, 399, 400, 401, 403

[56] References Cited

U.S. PATENT DOCUMENTS

| | | | |
|---|---|---|---|
| 4,240,676 | 12/1980 | Anderson et al. | |
| 4,402,514 | 9/1983 | Ryan et al. | 277/22 |
| 4,403,873 | 9/1983 | Gardner | 384/306 |
| 4,413,829 | 11/1983 | Pietsch | 377/3 |
| 4,421,425 | 12/1983 | Foucher et al. | 384/123 |
| 4,501,505 | 2/1985 | Chambers | 384/152 |
| 4,568,204 | 2/1986 | Chambers | 384/152 |
| 4,714,357 | 12/1987 | Groth et al. | 384/312 |
| 4,738,550 | 4/1988 | Gardner | 384/306 |
| 5,007,745 | 4/1991 | Ball et al. | 384/307 |
| 5,068,965 | 12/1991 | Ball et al. | 29/898.041 |
| 5,127,744 | 7/1992 | White et al. | 384/112 |
| 5,215,385 | 6/1993 | Ide | 384/100 |
| 5,271,676 | 12/1993 | Keck et al. | 384/111 |
| 5,320,431 | 6/1994 | Kallenberger | 384/322 |
| 5,456,535 | 10/1995 | Chen et al. | 384/398 |
| 5,480,234 | 1/1996 | Chen et al. | 384/313 |
| 5,720,558 | 2/1998 | Edney et al. | 384/309 |

*Primary Examiner*—Lenard A. Footland
*Attorney, Agent, or Firm*—Quarles & Brady

[57] ABSTRACT

According to the invention, a lubrication element is located in a sleeve bearing and extends through the central annular surface that mates with a shaft. The lubrication element has a cool lubricating fluid aperture that leads to a cool fluid space defined by a base face that is generally tangential to the central surface and a downstream face that is generally normal to the central surface. The down stream face extends at an angle to the longitudinal axis of the sleeve bearing. The lubrication element also has an upstream face that discharges hot lubricating fluid. The upstream face also extends at an angle to the longitudinal axis of the bearing. The upstream face directs hot fluid to a side of the sleeve bearing.

11 Claims, 4 Drawing Sheets

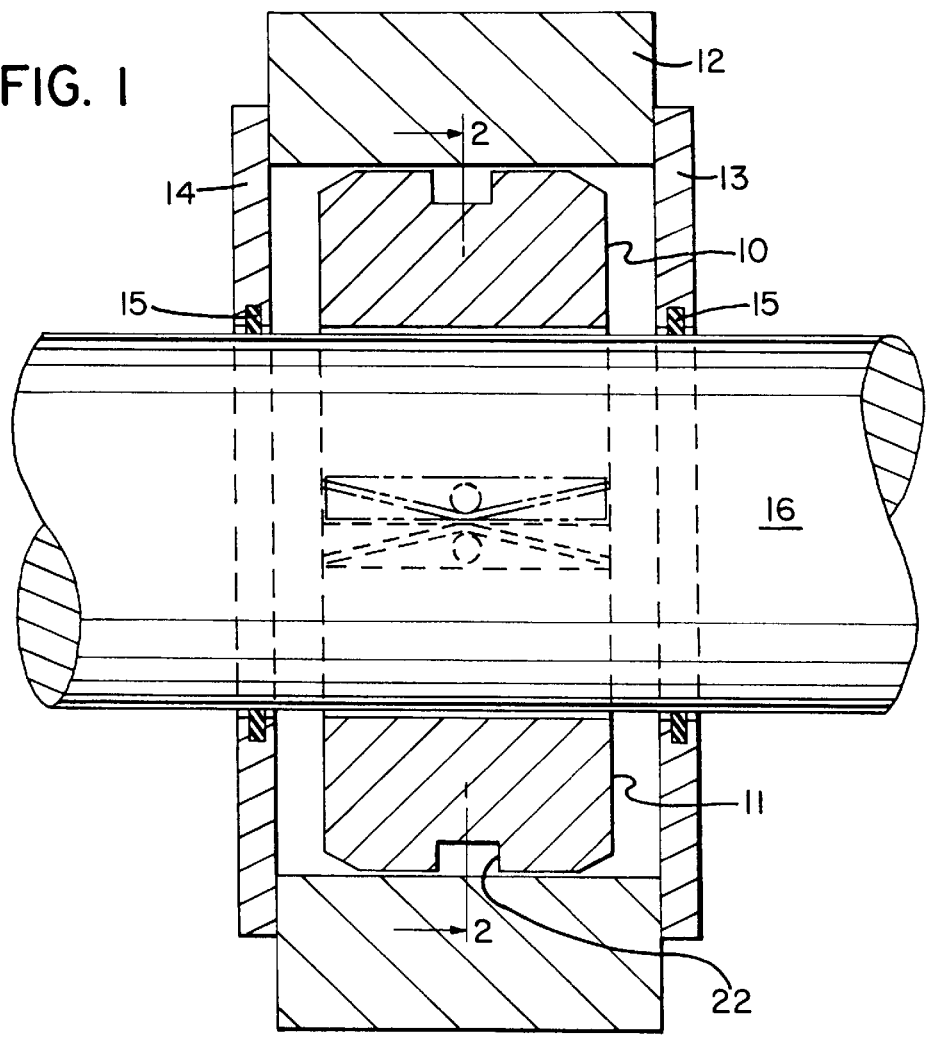
FIG. 1
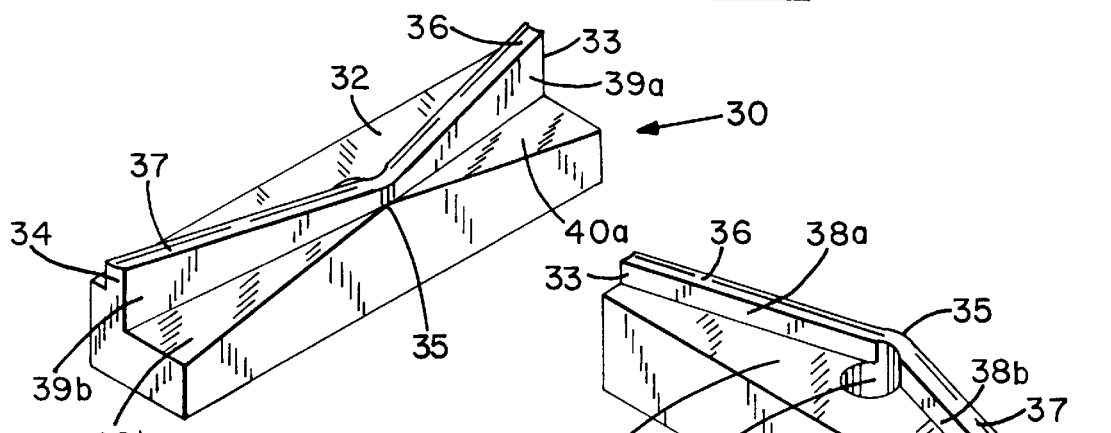
FIG. 8
FIG. 9

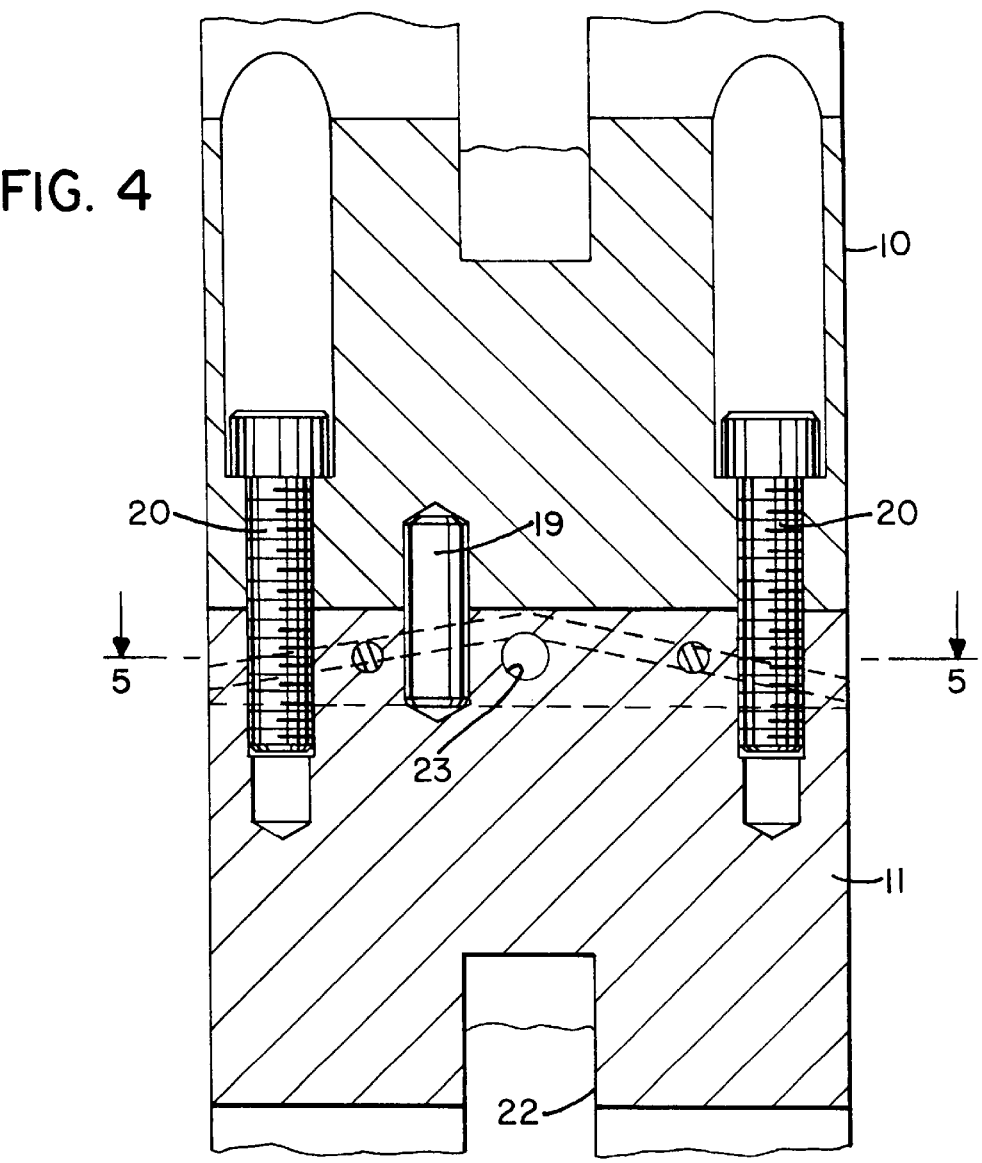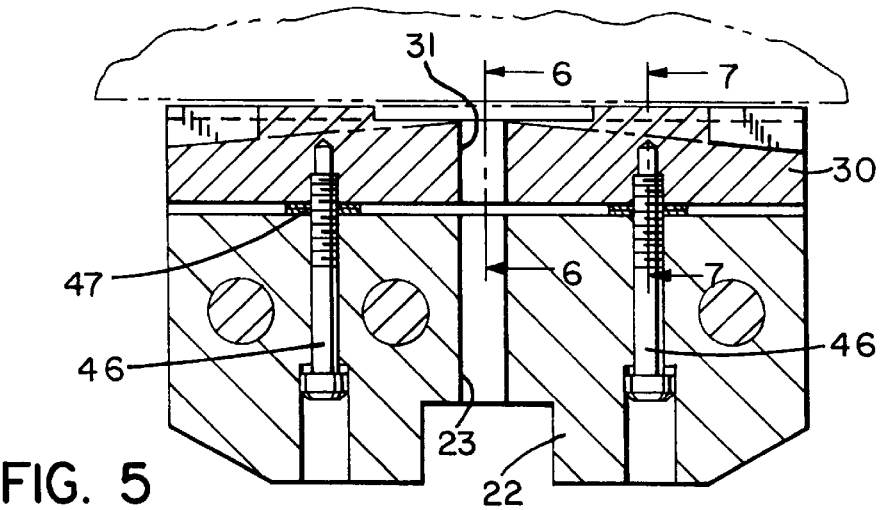

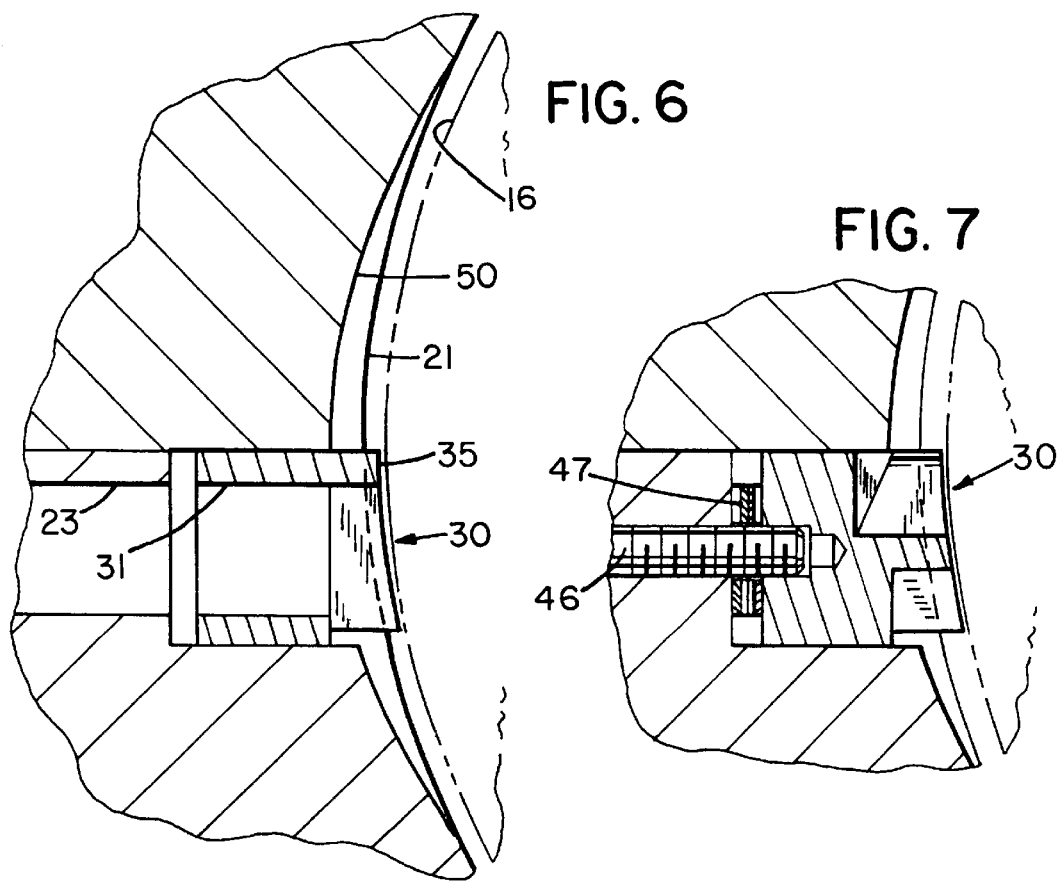
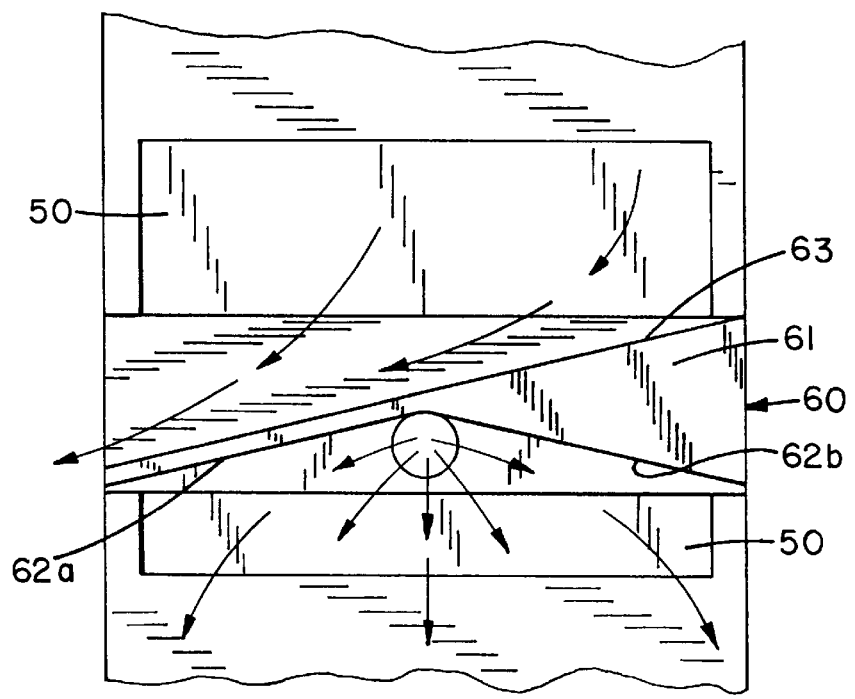

SLEEVE BEARING LUBRICATION

This application is a continuation-in-part of U.S. patent application Ser. No. 08/916,189 filed Aug. 21, 1997, U.S. Pat. No. 5,879,085, which is a continuation-in-part of U.S. patent application Ser. No. 08/848,986 filed Apr. 30, 1997, U.S. Pat. No. 5,795,076 which is a continuation of U.S. patent application Ser. No. 08/542,521 filed Oct. 13, 1995, now abandoned.

BACKGROUND OF THE INVENTION

This invention relates to the lubrication of sleeve bearings, and particularly to the distribution of cool lubricating fluid onto the bearing surface of the sleeve bearing and the removal of hot lubricating fluid therefrom.

A variety of approaches have been used for delivering lubricating fluid to the surfaces of sleeve bearings. One example is shown in U.S. Pat. No. 5,320,431 issued Jun. 14, 1994 to Kallenberger. This patent uses a plurality of axial lubrication grooves formed in and spaced along the bearing surface. The grooves include portions that are disposed at an angle to the direction of rotation so that lubricant is distributed circumferentially and axially on the bearing surface. Another example is U.S. Pat. No. 5,456,535 issued Oct. 10, 1995 to Chen, et al. In this patent, a pair of grooves extend longitudinally along the face of the bearing. One of the grooves is open at its ends and the other groove has closed ends. A lubricant orifice is located between the two grooves. The open-ended groove functions to remove hot lubricating fluid while the closed-end groove functions to mix hot carry-over fluid with cool lubricating fluid pumped through the orifice.

I provide a simple and efficient arrangement for the introduction of cool lubricating fluid to the surface of a sleeve bearing and the removal of hot lubricating fluid therefrom.

SUMMARY OF THE INVENTION

According to the invention, a lubrication element is located in a sleeve bearing and extends through the central annular surface that mates with a shaft. The lubrication element has a cool lubricating fluid aperture that leads to a cool fluid space defined by a base face that is generally tangential to the central surface and a downstream face that is generally normal to the central surface. The down stream face extends at an angle to the longitudinal axis of the sleeve bearing. The lubrication element also has an upstream face that discharges hot lubricating fluid. The upstream face also extends at an angle to the longitudinal axis of the bearing. The upstream face directs hot fluid to a side of the sleeve bearing.

The lubrication element may be formed integral with the sleeve bearing or may be a separate element. If a separate element is used, the element is preferably spring biased towards the surface of a shaft in the sleeve bearing.

Preferably, the downstream and upstream faces are formed on opposite sides of a ridge that wipes the surface of the shaft. The ridge may have a herringbone configuration with the fluid aperture located at the junction of the ridge. Alternatively, the ridge may be straight.

Cool oil entering through the aperture is distributed across the surface of the bearing by the cool fluid space. Hot lubricating fluid is wiped from the surface of the shaft and directed to one or both sides of the sleeve bearing by the upstream face. In this manner, cool lubricating fluid is constantly replenished and hot fluid is constantly withdrawn from the clearance space between the sleeve bearing and the shaft.

The foregoing and other objects and advantages of the invention will appear in the detailed description which follows. In the description, reference is made to the accompanying drawings which illustrate preferred embodiments of the invention.

BRIEF DESCRIPTION OF THE DRAWINGS

FIG. 1 is a view in vertical section of a sleeve bearing and enclosure in accordance with the present invention;

FIG. 4 is a view in vertical section taken in the plane of the line 4—4 of FIG. 2;

FIG. 5 is a view in horizontal section taken in the plane of the line 5—5 of FIG. 4;

FIG. 6 is an enlarged partial view in section taken in the plane of the line 6—6 of FIG. 5;

FIG. 7 is an enlarged partial view in section taken in the plane of the line 7—7 in FIG. 5;

FIGS. 8 and 9 are perspective views of the lubrication element; and

FIG. 10 is a view similar to FIG. 3, but showing an alternate embodiment of the invention.

DETAILED DESCRIPTION OF THE PREFERRED EMBODIMENTS

Figure 2:
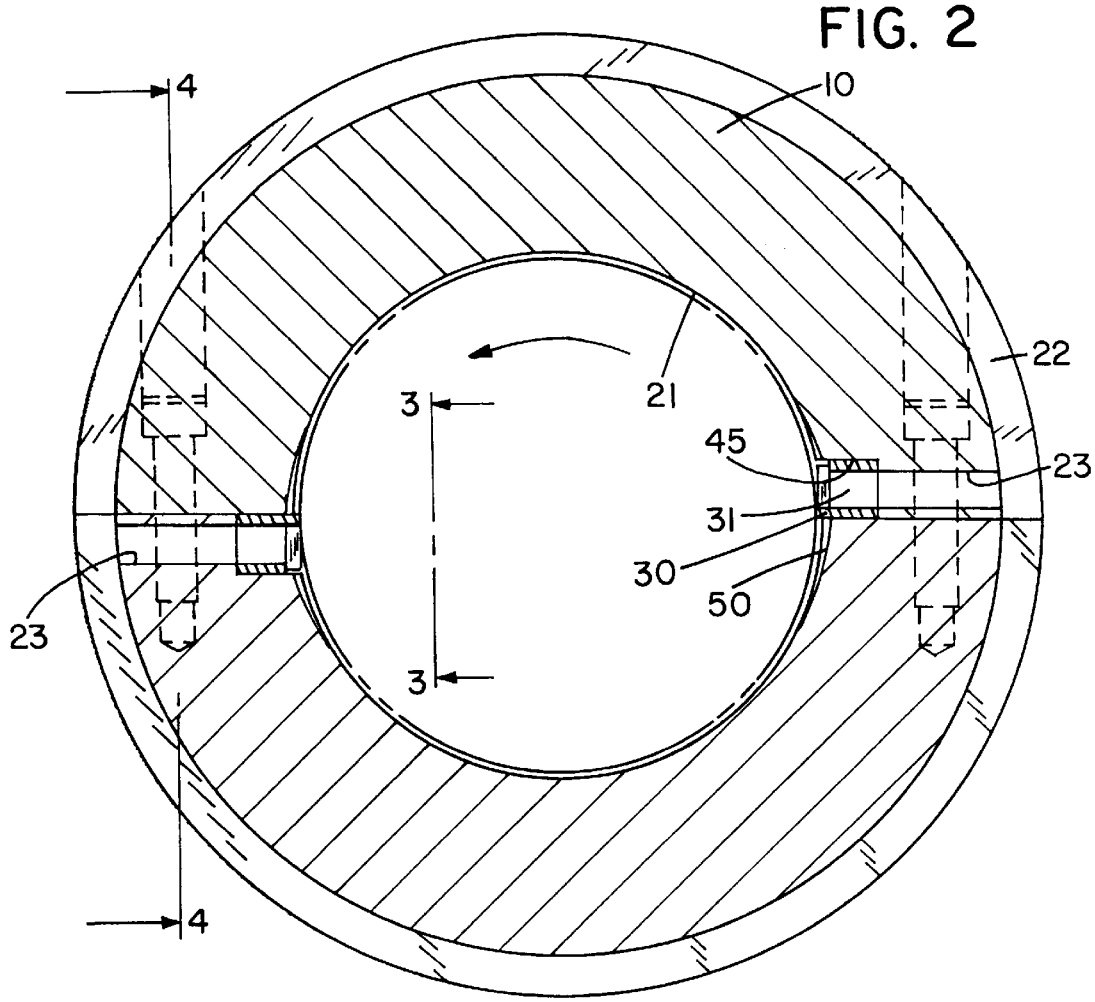
FIG. 2 is a view in vertical section taken in the plane of the line 2—2 in FIG. 1.

Referring to FIG. 1, sleeve bearing halves 10 and 11 are mounted in a housing formed of an outer circular cylindrical rim 12 to which end plates 13 and 14 are joined. The end plates 13 and 14 have central openings that receive seals 15 that engage the surface of a shaft 16 mounted in the sleeve bearing halves 10 and 11. The ends of the bearing halves 10 and 11 are aligned by dowels 19 and joined together by bolts 20. (See FIG. 4). When joined together, the bearing halves 10 and 11 define a central circular bearing surface 21. An annular channel 22 is formed in the joined bearing halves centrally of the width of the bearing. Cool lubricating fluid is provided to the bearing halves 10 and 11 along the annular channel 22 and through input apertures 23 formed at one end of each of the bearing halves 10 and 11. Hot lubricating fluid can exit the sleeve bearing at its side edges into the spaces between the ends of the sleeve bearing halves 10 and 11 and the end plates 13 and 14. The hot lubricating fluid is drained from the spaces through openings (not shown). The hot lubricating fluid is carried to a lubrication reservoir (not shown) through fluid lines, as is well known in the art. Likewise, cool lubricating fluid is provided to the channel 22 from the reservoir via additional fluid lines, as is well known in the art.

A lubrication element 30 is disposed at one end of each of the bearing halves 10 and 11. The lubrication element 30 has a central aperture 31 that is aligned with the cool lubrication fluid openings 23 in the bearing halves 10 and 11. The lubrication element 30 has a base surface 32 from which a herringbone ridge extends. The herringbone ridge is defined by ridge segments 33 and 34 joined at a junction 35 that corresponds to an edge of the fluid aperture 31. The ridge segments 33 and 34 have outer surfaces 36 and 37 spaced from the base surface 32. The ridge segments 33 and 34 define downstream faces 38a and 38b and upstream faces 39a and 39b, respectively. The included angle between the downstream edges 38a and 38b is less than 180°, and is preferably between 100 to 160°. The upstream faces 39a and 39b extend outwardly from discharge surfaces 40a and 40b, respectively which slope away from the junction 35 towards the edges of the lubrication element 30, as best seen in FIG. 8.

The lubrication elements 30 are mounted in longitudinal grooves 45 adjacent to one end of each of the bearing halves. The grooves 45 extend across the inlet apertures 23. The lubrication members 30 are mounted in place by bolts 46 received in threaded openings in the bottom of the lubrication element. Wave-style washers 47 are disposed between the bottom of the grooves 45 and the lubrication elements 30 to urge the lubrication elements outwardly towards the center of the sleeve bearing.

Figure 3:
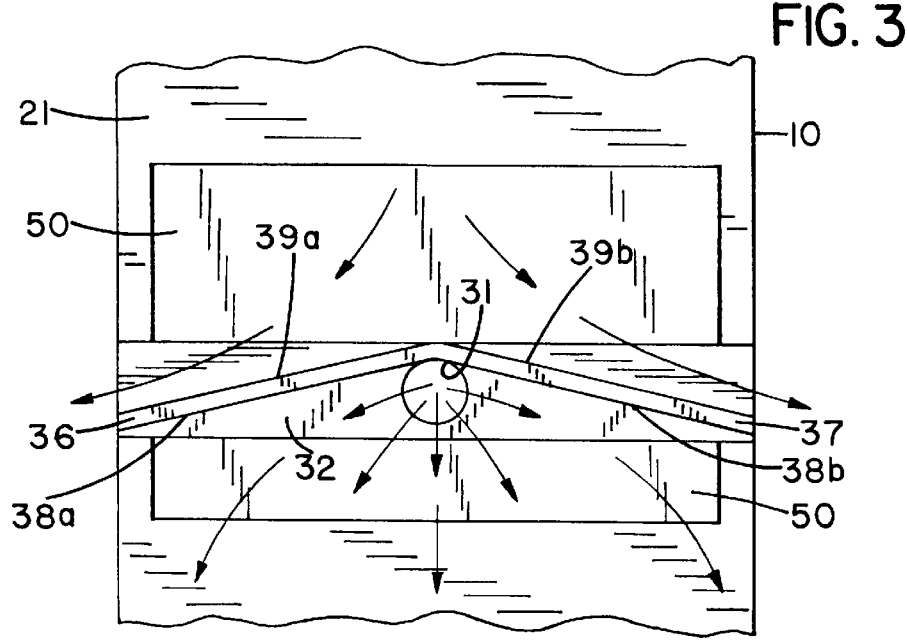
FIG. 3 is an enlarged partial view in elevation of the lubrication element in place in the sleeve bearing and taken in the plane of the line 3—3 in FIG. 2.

As shown in FIGS. 2 and 3, the central bearing surface 21 adjacent the ends of each bearing segment 10 and 11 is provided with a shallow circular recess 50 which defines a pocket. The lubrication elements 30 intersect the recesses 50 of adjacent bearing halves. The outer surfaces 36 and 37 of the ridge segments 33 and 34 are machined to the arc of the bearing surface 21. This radius of the arc on the surfaces 36 and 37 is slightly larger than that of a shaft 16 mounted in the bearing halves 10 and 11. The surfaces 36 and 37 of the ridge segments 33 and 34 project radially inwardly of the bearing surface 21 to the surface of the shaft 16. The amount of such projection is controlled by the degree to which the bolts 46 are tightened and the wave-style washers 47 are compressed.

As best shown in FIG. 3, cool lubricating fluid entering through the aperture 31 flows into the space defined by the base face 32 and the downstream faces 38a and 38b of the ridge. As the shaft rotates in the bearing, the cool lubricating fluid is drawn away from the space and distributed over the width of the sleeve bearing and along the surface of the shaft 16. At the same time, the outer surfaces 36 and 37 of the ridge wipe the surface of the shaft so that hot fluid on the shaft is collected against the upstream faces 39a and 39b. The hot fluid drains to the sides of the sleeve bearing along the discharge surfaces 40a and 40b. The space defined by each upstream face 39a or 39b and its respective discharge surface 40a or 40b increases towards the sides of the bearing halves to accommodate the accumulating hot fluid. In this manner, cool lubricating fluid is continuously supplied to the bearing and shaft surfaces and hot fluid is continuously wiped off.

There are instances in which it may be undesirable to have fluid wiped from the shaft's surface and deposited on both sides of the sleeve bearing. In those instances, the alternative arrangement of FIG. 10 can be employed. In FIG. 10, the lubrication element 60 is similar to the element 30 in the first embodiment. It differs in the configuration of the ridge 61. In the embodiment of FIG. 10, the ridge 61 has downstream faces 62a and 62b arranged in a herringbone fashion, but the upstream face 63 is straight rather than herringbone. The upstream face 63 of the ridge 61 does, however, extend at an angle to the axis of the sleeve bearing. The result is that hot fluid wiped from the shaft's surface will be deposited to only one side of the sleeve bearing.

Although the lubrication element has been described as being a separate member inserted into the sleeve bearings, the element could be formed integral by machining the sleeve bearing central surface 21 to provide the appropriate faces and ridge.

The lubrication element 30 or 60 may be manufactured from bronze, babbitt metal, or other suitable material.

The sleeve bearing has been described as having two halves forming two pockets each with a lubrication element. The sleeve bearing could be formed from a single continuous member with one or more pockets each containing a lubrication element. Also, the sleeve bearing could be formed of more than two members with one or multiple pockets. In any embodiment, it is preferable to have one lubrication element associated with each pocket.

I claim:

1. A lubricating arrangement for a sleeve bearing having a central circular bearing surface to receive a shaft, comprising:

a lubrication element in the sleeve bearing and extending through the central surface, said element having a cool lubricating fluid aperture that leads to a cool fluid space defined by a base face that is generally tangential to the central surface and a downstream face that is generally normal to the central surface, the downstream face extending at an angle to the axis of the bearing surface, and said element also having an upstream face that discharges hot lubricating fluid, the upstream face extending at an angle to the longitudinal opening and directing the hot fluid to a side of the sleeve bearing.

2. A lubricating arrangement according to claim 1 wherein the downstream and upstream faces are formed on opposite sides of a ridge that wipes the surface of the shaft.

3. A lubricating arrangement according to claim 2 wherein the ridge has a herringbone configuration with the fluid aperture located at a junction of the ridge.

4. A lubricating arrangement according to claim 3 wherein the element is separate from the sleeve bearing and spring biased toward the center of the circular surface to have the ridge ride along the surface of the shaft.

5. A lubricating arrangement according to claim 3 wherein the element is integral with the sleeve bearing.

6. A lubricating arrangement according to claim 1 wherein the sleeve bearing is formed with one or more pockets and a lubrication element is associated with each pocket.

7. A lubricating arrangement according to claim 1 wherein the sleeve bearing has a lubricant channel in its outer perimeter and a lubricant opening extends from the channel in alignment with the aperture in the lubrication element.

8. A lubricating arrangement for a sleeve bearing having a central bearing surface to receive a shaft, comprising:

a ridge in the sleeve bearing that extends through the bearing surface and wipes the surface of the shaft, the ridge having an upstream side and a downstream side, the ridge extending at an angle to the axis of the bearing surface, and a cool lubricating aperture extending through the bearing surface on the downstream side of the ridge.

9. A lubricating arrangement according to claim 8 wherein the ridge is formed from two segments that define an obtuse angle.

10. A lubricating arrangement according to claim 9 wherein the aperture is located at the junction of the segments.

11. A lubricating arrangement according to claim 8 wherein the ridge is formed on an element that is mounted in the sleeve bearing and the element is spring biased toward the shaft.

* * * * *